(12) United States Patent
Tseng et al.

(10) Patent No.: US 8,188,700 B2
(45) Date of Patent: May 29, 2012

(54) APPARATUS AND METHOD FOR DRIVING SENSORLESS MOTOR

(75) Inventors: Chien-Chung Tseng, Hsinchu County (TW); Hsien-Wen Hsu, Hsinchu County (TW); Chien-Jen Hsieh, Hsinchu County (TW)

(73) Assignee: inergy Technology Inc., Hsinchu County (TW)

( * ) Notice: Subject to any disclaimer, the term of this patent is extended or adjusted under 35 U.S.C. 154(b) by 385 days.

(21) Appl. No.: 12/560,442

(22) Filed: Sep. 16, 2009

(65) Prior Publication Data

US 2011/0062907 A1  Mar. 17, 2011

(51) Int. Cl.
*H02P 1/46* (2006.01)
(52) U.S. Cl. ............ 318/721; 318/400.32; 318/400.34; 318/779; 318/799
(58) Field of Classification Search .......... 318/59, 318/62, 101, 400.01, 400.07, 400.09, 400.11, 318/400.14, 599, 652, 721, 779, 799, 430, 318/432, 437, 400.32, 400.34, 701
See application file for complete search history.

(56) References Cited

U.S. PATENT DOCUMENTS

| | | | | | |
|---|---|---|---|---|---|
| 4,928,043 | A | * | 5/1990 | Plunkett | 318/400.34 |
| 5,986,417 | A | * | 11/1999 | Nicolai et al. | 318/245 |
| 6,034,493 | A | * | 3/2000 | Boyd et al. | 318/400.31 |
| 6,639,370 | B1 | * | 10/2003 | Gabrys | 318/161 |
| 6,949,900 | B1 | * | 9/2005 | Berringer | 318/400.03 |
| 7,202,623 | B2 | * | 4/2007 | Zhou et al. | 318/400.11 |
| 7,821,217 | B2 | * | 10/2010 | Abolhassani et al. | 318/432 |

* cited by examiner

*Primary Examiner* — Walter Benson
*Assistant Examiner* — Antony M Paul
(74) *Attorney, Agent, or Firm* — CKC & Partners Co., Ltd.

(57) ABSTRACT

An apparatus and a method for driving a sensorless motor are described and shown in the specification and drawings, where the method includes steps as follows. First, a control signal is acquired, where the control signal has information of a predetermined rotational speed. Next, energy is supplied and progressively increased to the sensorless motor, so as to rotate a rotor of the sensorless motor. Then, a position of the rotor is detected. Finally, the energy is gradually regulated so that the sensorless motor is maintained at the predetermined rotational speed.

9 Claims, 3 Drawing Sheets

APPARATUS AND METHOD FOR DRIVING SENSORLESS MOTOR

BACKGROUND

1. Technical Field

The present disclosure relates to an electronic device, and more particularly, an apparatus and a method for driving a sensorless motor.

2. Description of Related Art

With the fast development of the electronics industry, the application of sensorless motors has become more popular. In general, a conventional motor-driving circuit directly regulates the rotational speed of the sensorless motor to be constant whenever initially driving the sensorless motor, however, the sensorless motor often fails to start-up.

In view of the foregoing, there is an urgent need in the related field to provide a novel apparatus capable of decreasing the failure rate of driving the sensorless motor. The present disclosure meets this need.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present disclosure is directed to an apparatus for driving a sensorless motor, so as to overcome the failure in the start-up of the sensorless motor.

According to one embodiment of the present invention, the apparatus includes a receiver, a starter, a detector and an electrical controller. The receiver can acquire a control signal, wherein the control signal has information of a predetermined rotational speed. The starter can supply and progressively increase energy to the sensorless motor after the control signal is acquired, so as to rotate a rotor of the sensorless motor. The detector can detect a position of the rotor after the energy is supplied to the sensorless motor. The electrical controller can gradually regulate the energy after the position of the rotor is detected, so that the sensorless motor is maintained at the predetermined rotational speed.

In this way, the apparatus smoothly supplies energy to the sensorless motor first, so as to prevent the failure in the start-up of the sensorless motor. Then, the position of the rotor is detected to signify that the sensorless motor is effectively operated, and furthermore the apparatus gradually regulates the rotational speed of the sensorless motor to conform to the predetermined rotational speed.

In another aspect, the present disclosure is directed to a method for driving a sensorless motor, so as to overcome the failure in the start-up of the sensorless motor.

According to one embodiment of the present invention, the method includes steps as follows. First, a control signal is acquired, wherein the control signal has information of a predetermined rotational speed. Next, energy is supplied and progressively increased to the sensorless motor after the control signal is acquired, so as to rotate a rotor of the sensorless motor. Then, a position of the rotor is detected after the energy is supplied to the sensorless motor. Finally, the energy is gradually regulated after the position of the rotor is detected, so that the sensorless motor is maintained at the predetermined rotational speed.

In this method, energy is smoothly supplied to the sensorless motor first, so as to prevent the failure in the start-up of the sensorless motor. Then, the position of the rotor is detected to signify that the sensorless motor is effectively operated, and furthermore the rotational speed of the sensorless motor is gradually regulated to conform to the predetermined rotational speed.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

DETAILED DESCRIPTION

Figure 1:
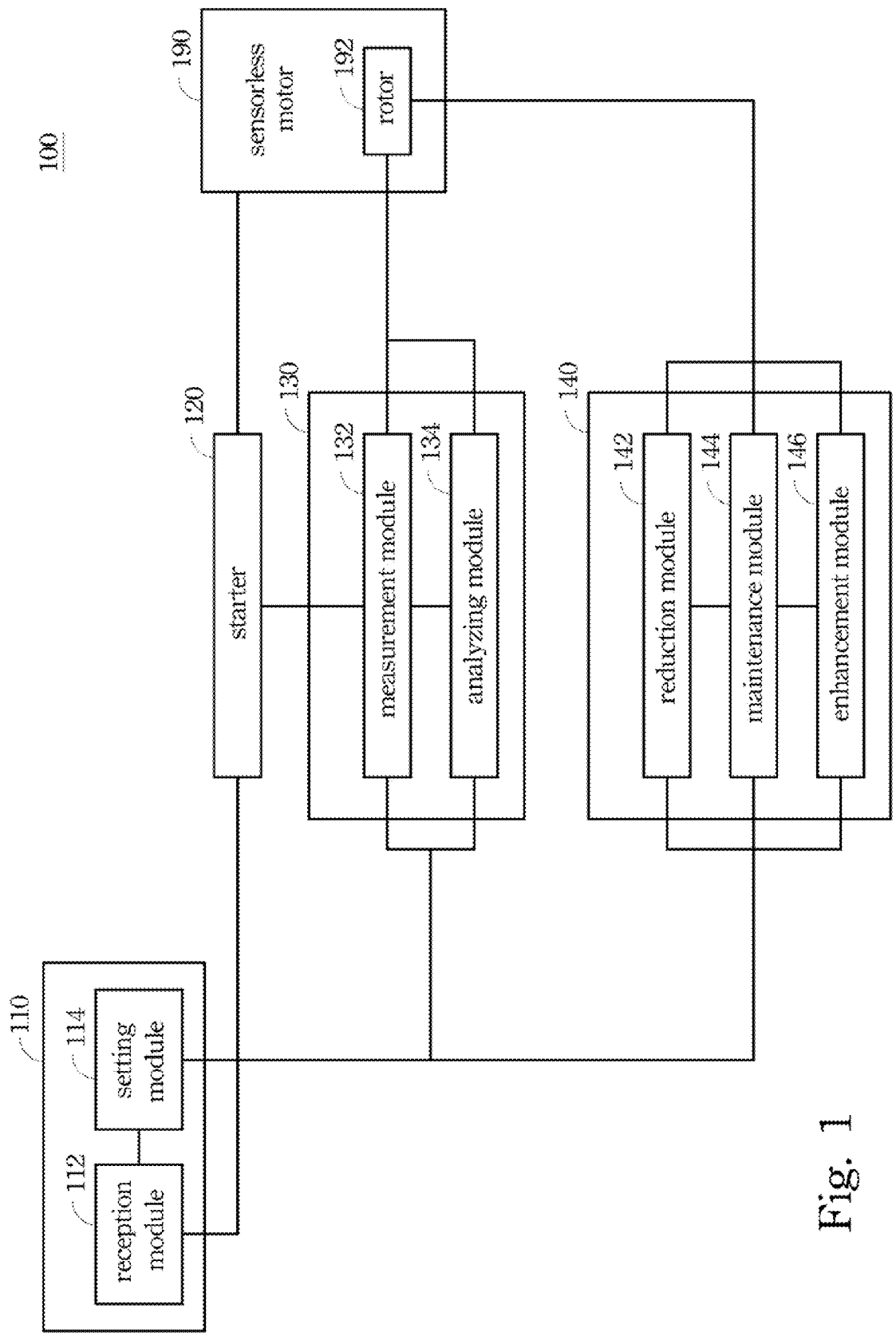
FIG. 1 is a functional block diagram illustrating an apparatus for driving a sensorless motor according to one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The terms used in this specification generally have their ordinary meanings in the art, within the context of the present disclosure, and in the specific context where each term is used. Certain terms that are used to describe the present disclosure are discussed below, or elsewhere in the specification, to provide additional guidance to the practitioner regarding the description of the present disclosure. The use of examples anywhere in this specification, including examples of any terms discussed herein, is illustrative only, and in no way limits the scope and meaning of the invention or of any exemplified term. Likewise, the invention is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprise or comprising", "include or including", "have or having", "contain or containing" and the like are to be understood to be open-ended, i.e., to mean including but not limited to.

In one aspect, the present disclosure is directed to an apparatus for driving a sensorless motor. The apparatus may be easily inserted into existing devices, and may be applicable or readily adaptable to all technology.

Please refer to FIG. 1 which is a functional block diagram illustrating an apparatus 100 for driving a sensorless motor 190 according to one embodiment of the present invention. As shown in FIG. 1, the apparatus 100 includes a receiver 110, a starter 120, a detector 130 and an electrical controller 140.

In operation, the receiver 110 can acquire a control signal, wherein the control signal has information of a predetermined rotational speed. The starter 120 can supply and progressively increase energy to the sensorless motor 190 after the control signal is acquired, so as to rotate a rotor 192 of the sensorless motor 190. The detector 130 can detect a position of the rotor 192 after the energy is supplied to the sensorless motor 190. The electrical controller 140 can gradually regulate the energy after the position of the rotor 192 is detected, so that the sensorless motor 192 is maintained at the predetermined rotational speed.

In this way, the apparatus 100 smoothly supplies energy to the sensorless motor 190 first, so as to prevent the failure in the start-up of the sensorless motor 190. Then, the position of the rotor 192 is detected to signify that the sensorless motor 190 is effectively operated, and furthermore the apparatus 100 gradually regulates the rotational speed of the sensorless motor 190 to conform to the predetermined rotational speed.

The receiver 110 comprises a reception module 112 and a setting module 114. In operation, the reception module 112 can receive at least one pulse width modulation signal as the control signal. The setting module 114 can determine the predetermined rotational speed of the sensorless motor 190 according to a duty ratio of the pulse width modulation signal. The relatively high duty ratio represents that the predetermined rotational speed is relatively fast; on the contrary, the relatively low duty ratio represents that the predetermined rotational speed is relatively slow.

In practice, the reception module 112 may acquire the pulse width modulation signal from a control device or the like. It should be appreciated that said control device is only an example and should not be regarded as limitations of the present invention. Those with ordinary skill in the art may select a signal source depending on the desired application.

For example, the sensorless motor 190 may be adapted in a fan. A user can adjust a rotational speed of the fan through control knobs of the fan. Therefore, the reception module 112 acquires the control signal related to the rotational speed of the fan, and the setting module 114 determines the rotational speed of the fan.

The detector 130 comprises a measurement module 132 and an analyzing module 134. In operation, the measurement module 132 can measure the back electromotive force of the sensorless motor 190. The analyzing module 134 can analyze the position of the rotor according to the back electromotive force. For example, the detector 130 is a zero crossing detector.

The electrical controller 140 comprises a reduction module 142 and a maintenance module 144. In operation, the reduction module 142 can progressively decrease the energy supplied to the sensorless motor 190 when the rotational speed of the sensorless motor 190 exceeds the predetermined rotational speed after the position of the rotor 192 is detected until the rotational speed of the sensorless motor 190 conforms to the predetermined rotational speed. The maintenance module 144 can regulate the energy to be constant when the rotational speed of the sensorless motor 190 conforms to the predetermined rotational speed, so that the sensorless motor 190 is maintained at the predetermined rotational speed.

Moreover, the electrical controller 140 also comprises an enhancement module 146. In operation, the enhancement module 146 can progressively increase the energy supplied to the sensorless motor 190 when the rotational speed of the sensorless motor 190 is lower than the predetermined rotational is speed after the position of the rotor 192 is detected until the rotational speed of the sensorless motor 190 conforms to the predetermined rotational speed. Furthermore, the maintenance module 144 can regulate the energy to be constant when the rotational speed of the sensorless motor 190 conforms to the predetermined rotational speed, so that the sensorless motor 190 is maintained at the predetermined rotational speed.

Figure 2A:
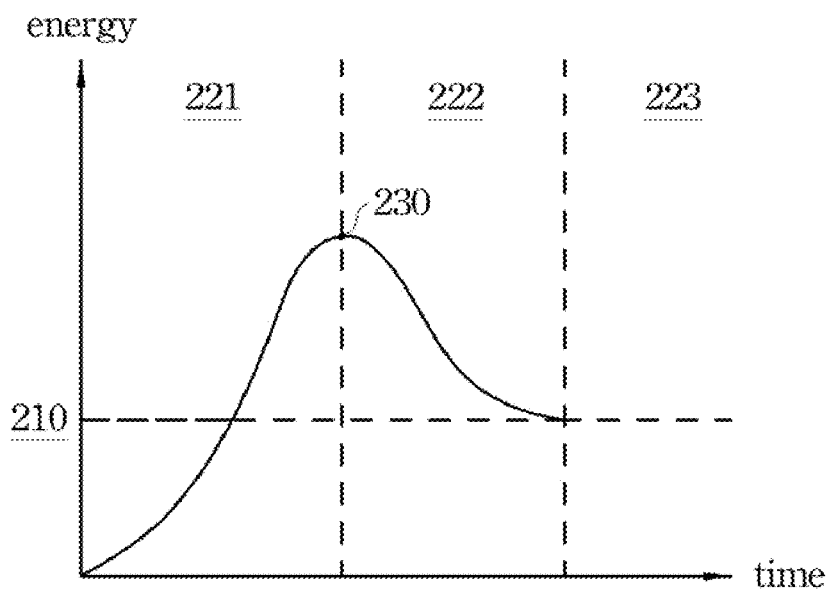
FIG. 2A is a timing diagram illustrating one operation mode of the apparatus of FIG. 1.
Figure 2B:
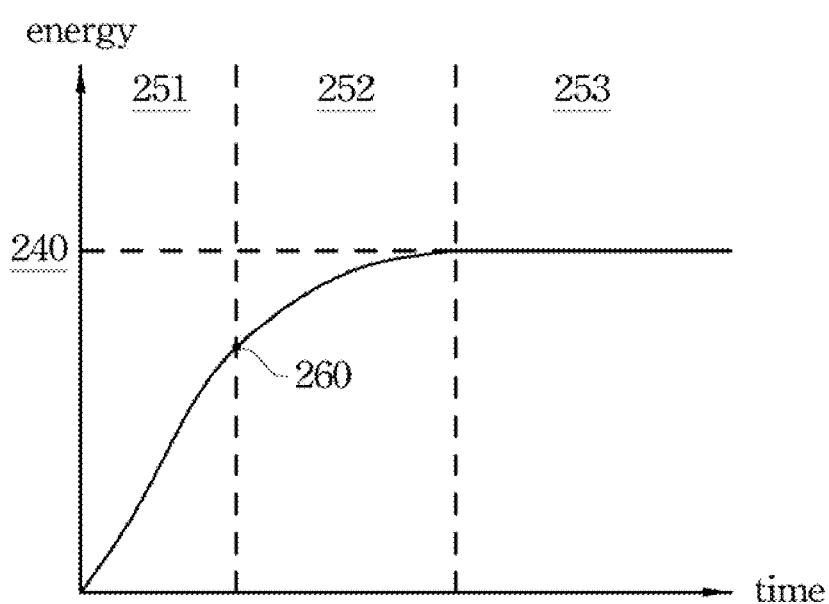
FIG. 2B is a timing diagram illustrating another operation mode of the apparatus of FIG. 1.

For a more complete understanding of the apparatus 100, FIG. 2A and FIG. 2B are presented to illustrate two operation modes of the electronic pen 100 respectively.

Please refer to FIG. 2A which is a timing diagram illustrating one operation mode of the apparatus 100 of FIG. 1. As shown in FIG. 2A, after the control signal is acquired by the apparatus 100, energy supplied to the sensorless motor is progressively increased in the first stage 221 until the position of the rotor is detected at the time point 230. Next, when the rotational speed of the sensorless motor exceeds the predetermined rotational speed, the energy supplied to the sensorless motor is progressively decreased in the second stage 222 until the rotational speed of the sensorless motor conforms to the predetermined rotational speed. Once the rotational speed of the sensorless motor conforms to the predetermined rotational speed, the energy is regulated at the energy value 210 stably in the third stage 223, so that the sensorless motor is maintained at the predetermined rotational speed.

Please refer to FIG. 2B which is a timing diagram illustrating another operation mode of the apparatus 100 of FIG. 1. As shown in FIG. 2B, after the control signal is acquired by the apparatus 100, energy supplied to the sensorless motor is progressively increased in the first stage 251 until the position of the rotor is detected at the time point 260. Next, when the rotational speed of the sensorless motor is lower than the predetermined rotational speed, the energy supplied to the sensorless motor is progressively increased in the second stage 252 until the rotational speed of the sensorless motor conforms to the predetermined rotational speed. Once the rotational speed of the sensorless motor conforms to the predetermined rotational speed, the energy is regulated at the energy value 240 stably in the third stage 253, so that the sensorless motor is maintained at the predetermined rotational speed.

In another aspect, the present disclosure is directed to a method for driving a sensorless motor. The method may be easily adapted in existing devices, and may be applicable or readily adaptable to all technology.

Figure 3:
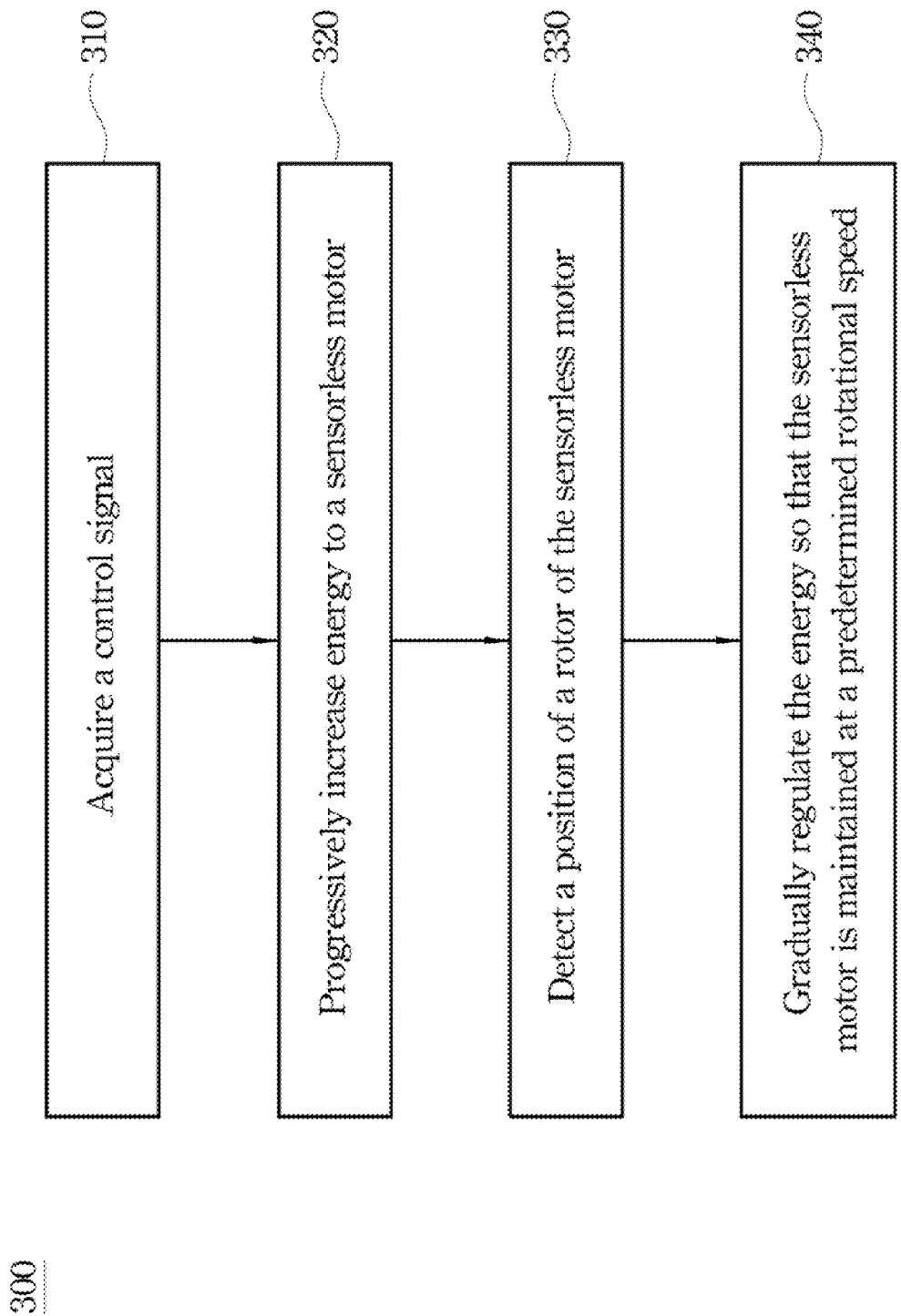
FIG. 3 is a flowchart illustrating a method for driving the sensorless motor according to another embodiment of the present invention.

Please refer to FIG. 3 which is a flowchart illustrating a method 300 for driving the sensorless motor according to another embodiment of the present invention. As shown in FIG. 3, the method 300 comprises steps 310, 320, 330 and 340. In the method 300, it should be noted that one step might be performed in series, in parallel, in combination, or otherwise in conjunction with another if the specific order is not described or inferred in the embodiment.

First, a control signal is acquired in step 310, wherein the control signal has information of a predetermined rotational speed. Next, energy is supplied and progressively increased to the sensorless motor in step 320 after the control signal is acquired, so as to rotate a rotor of the sensorless motor. Then, a position of the rotor is detected in step 330 after the energy is supplied to the sensorless motor. Finally, the energy is gradually regulated after the position of the rotor is detected in step 340, so that the sensorless motor is maintained at the predetermined rotational speed.

In the method 300, energy is smoothly supplied to the sensorless motor first, so as to prevent the failure in the start-up of the sensorless motor. Then, the position of the rotor is detected to signify that the sensorless motor is effectively operated, and furthermore the rotational speed of the sensorless motor is gradually regulated to conform to the predetermined rotational speed.

During step 310, at least one pulse width modulation signal is received as the control signal, and then the predetermined rotational speed of the sensorless motor is determined according to a duty ratio of the pulse width modulation signal. The relatively high duty ratio represents that the predetermined rotational speed is relatively fast; on the contrary, the relatively low duty ratio represents that the predetermined rotational speed is relatively slow.

During step 330, back electromotive force of the sensorless motor is measured, and the position of the rotor is analyzed according to the back electromotive force.

During step 340, the energy supplied to the sensorless motor is progressively decreased when the rotational speed of the sensorless motor exceeds the predetermined rotational speed after the position of the rotor is detected until the rotational speed of the sensorless motor conforms to the predetermined rotational speed; then, the energy is regulated to be constant when the rotational speed of the sensorless motor conforms to the predetermined rotational speed, so that the sensorless motor is maintained at the predetermined rotational speed.

Additionally or alternatively, during step 340, the energy supplied to the sensorless motor is progressively increased when the rotational speed of the sensorless motor is lower than the predetermined rotational speed after the position of the rotor is detected until the rotational speed of the sensorless motor conforms to the predetermined rotational speed; the energy is regulated to be constant when the rotational speed of the sensorless motor conforms to the predetermined rotational speed, so that the sensorless motor is maintained at the predetermined rotational speed.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "steps of" in the claims herein is not intended to invoke the provisions of 35 U.S.C. §112, 6th paragraph.

What is claimed is:

1. An apparatus for driving a sensorless motor, the apparatus comprising:
   a receiver for acquiring a control signal, wherein the control signal comprises information of a predetermined rotational speed;
   a starter for supplying and progressively increasing energy to the sensorless motor after the control signal is acquired, so as to rotate a rotor of the sensorless motor;
   a detector for detecting a position of the rotor after the energy is supplied to the sensorless motor; and
   an electrical controller for gradually regulating the energy after the position of the rotor is detected, so that the sensorless motor is maintained at the predetermined rotational speed,
   wherein the electrical controller comprises:
   a reduction module for progressively decreasing the energy supplied to the sensorless motor when a rotational speed of the sensorless motor exceeds the predetermined rotational speed after the position of the rotor is detected until the rotational speed of the sensorless motor conforms to the predetermined rotational speed:
   a maintenance module for regulating the energy to be constant when the rotational speed of the sensorless motor conforms to the predetermined rotational speed, so that the sensorless motor is maintained at the predetermined rotational speed; and
   an enhancement module for progressively increasing the energy supplied to the sensorless motor when the rotational speed of the sensorless motor is lower than the predetermined rotational speed after the position of the rotor is detected until the rotational speed of the sensorless motor conforms to the predetermined rotational speed.

2. The apparatus of claim 1, wherein the receiver comprises:
   a reception module for receiving at least one pulse width modulation signal as the control signal; and
   a setting module for determining the predetermined rotational speed of the sensorless motor according to a duty ratio of the pulse width modulation signal.

3. The apparatus for driving of claim 1, wherein the detector comprises:
   a measurement module for measuring back electromotive force of the sensorless motor; and
   an analyzing module for analyzing the position of the rotor according to the back electromotive force.

4. A method for driving a sensorless motor, the method comprising steps of:
   (a) acquiring a control signal, wherein the control signal comprises information of a predetermined rotational speed;
   (b) supplying and progressively increasing energy to the sensorless motor after the control signal is acquired, so as to rotate a rotor of the sensorless motor;
   (c) detecting a position of the rotor after the energy is supplied to the sensorless motor; and
   (d) gradually regulate the energy after the position of the rotor is detected, so that the sensorless motor is maintained at the predetermined rotational speed,
   wherein step (d) comprises:
   progressively decreasing the energy supplied to the sensorless motor when a rotational speed of the sensorless motor exceeds the predetermined rotational speed after the position of the rotor is detected until the rotational speed of the sensorless motor conforms to the predetermined rotational speed;
   regulating the energy to be constant when the rotational speed of the sensorless motor conforms to the predetermined rotational speed, so that the sensorless motor is maintained at the predetermined rotational speed; and
   progressively increasing the energy supplied to the sensorless motor when the rotational speed of the sensorless motor is lower than the predetermined rotational speed after the position of the rotor is detected until the rotational speed of the sensorless motor conforms to the predetermined rotational speed.

5. The method of claim 4, wherein step (a) comprises:
receiving at least one pulse width modulation signal as the control signal; and
determining the predetermined rotational speed of the sensorless motor according to a duty ratio of the pulse width modulation signal.

6. The method of claim 4, wherein step (c) comprises:
measuring back electromotive force of the sensorless motor; and
analyzing the position of the rotor according to the back electromotive force.

7. An apparatus for driving a sensorless motor, the apparatus comprising:
means for acquiring a control signal, wherein the control signal comprises information of a predetermined rotational speed;
means for supplying and progressively increasing energy to the sensorless motor after the control signal is acquired, so as to rotate a rotor of the sensorless motor;
means for detecting a position of the rotor after the energy is supplied to the sensorless motor; and
means for gradually regulating the energy after the position of the rotor is detected, so that the sensorless motor is maintained at the predetermined rotational speed,
wherein the means for gradually regulating the energy comprises:
means for progressively decreasing the energy supplied to the sensorless motor when a rotational speed of the sensorless motor exceeds the predetermined rotational speed after the position of the rotor is detected until the rotational speed of the sensorless motor conforms to the predetermined rotational speed; and
means for regulating the energy to be constant when the rotational speed of the sensorless motor conforms to the predetermined rotational speed, so that the sensorless motor is maintained at the predetermined rotational speed; and
means for progressively increasing the energy supplied to the sensorless motor when the rotational speed of the sensorless motor is lower than the predetermined rotational speed after the position of the rotor is detected until the rotational speed of the sensorless motor conforms to the predetermined rotational speed.

8. The apparatus of claim 7, wherein the means for acquiring the control signal comprises:
means for receiving at least one pulse width modulation signal as the control signal; and
means for determining the predetermined rotational speed of the sensorless motor according to a duty ratio of the pulse width modulation signal.

9. The apparatus for driving of claim 7, wherein the means for detecting the position of the rotor comprises:
means for measuring back electromotive force of the sensorless motor; and
means for analyzing the position of the rotor according to the back electromotive force.

* * * * *